United States Patent [19]
Dodd

[11] 3,763,539
[45] Oct. 9, 1973

[54] APPARATUS FOR EXTRACTING BALL BEARINGS

[76] Inventor: Jerry S. Dodd, Rt. No. 1, Brashear, Tex. 75420

[22] Filed: Feb. 14, 1972

[21] Appl. No.: 225,844

[52] U.S. Cl.................. 29/201, 29/260, 29/263, 29/283
[51] Int. Cl............................................ B23p 19/04
[58] Field of Search..................... 29/201, 260, 263, 29/283

[56] References Cited
UNITED STATES PATENTS

| | | | |
|---|---|---|---|
| 1,627,965 | 5/1927 | Gamble | 29/201 |
| 2,496,005 | 1/1950 | Grant | 29/263 |
| 2,566,847 | 9/1951 | Miller | 29/260 |

Primary Examiner—Thomas H. Eager
Attorney—Tom Arnold et al.

[57] ABSTRACT

Apparatus for extracting ball bearing assemblies and the like that may be received about a shaft and/or may be press-fitted within a bearing recess in such manner that extraction thereof may be very difficult. A bearing extractor, having a plurality of pairs of extracting fingers carried thereby, may be brought into engagement with a ball bearing in such manner that the pairs of expandable finger assemblies may be inserted into an annular groove in the bearing assembly defined by spaced inner and outer bearing races. The extracting finger assemblies then may be spread or expanded mechanically to tightly engage one or both of the inner and outer races of the bearing. A threaded force applying member, retained by the housing of the bearing extractor, may then be manipulated to apply linear force between the extractor housing and the structure retaining the bearing, thereby extracting the bearing from the bearing retaining structure.

17 Claims, 2 Drawing Figures

PATENTED OCT 9 1973

3,763,539

APPARATUS FOR EXTRACTING BALL BEARINGS

FIELD OF THE INVENTION

This invention relates generally to devices for extraction of ball bearings from a bearing retaining structure and is more particularly directed to the provision of bearing extraction apparatus including expandable mechanical elements that may be received within an annular recess defined between the inner and outer races of a ball bearing to establish sufficient mechanical connection between the bearing and the bearing extractor to facilitate extraction thereof.

BACKGROUND OF THE INVENTION

Many mechanical devices are provided with ball bearing assemblies, generally referred to as ball bearings, that are employed to transfer sliding friction into rolling friction and thereby substantially reduce the amount of friction that might otherwise occur between moving parts. One example of ball bearings is the provision of a ball bearing to establish relatively friction-free rotatable mechanical connection between the rear axle of some automobiles and the housing through which the rotatable axle extends.

Frequently, as is depicted in broken line in FIG. 1 of the drawing, the rotatable axle of an automobile may extend through the inner race of a bearing, while the outer race of the bearing is received in tight engagement within a bearing recess.

The outer race of the bearing may be press-fitted within a suitable bearing recess and/or the inner race of the bearing may be press-fitted about an appropriate surface defined on the rotatable shaft. Bearings so situated are very difficult to extract because it is generally not possible to insert mechanical devices behind the bearings in order to impart forces to the bearings of sufficient magnitude to overcome the friction that retains the bearing in place. It may be necessary, therefore, to pry the bearing from its recess, which often results in damage to the bearing structure or to the recess within which the bearing is retained. It may also be necessary to cut the bearing assembly apart and separately extract the various parts from which the bearing assembly is composed. The cutting operation, however, obviously destroys the bearing and may also damage other mechanical apparatus. Additionally, extraction of bearings by prying, cutting and the like is obviously extremely time consuming and therefore quite expensive.

A number of mechanisms have been developed for the purpose of extracting bearings, bushings, and the like, one of which being represented by U. S. Pat. No. 2,496,005 to Grant, which employs external gripping devices to grip a bushing that may be forceably extracted. Similar mechanisms have been employed for the removal of cylindrical sleeves as taught by U. S. Pat. No. 2,566,847 to Miller. U. S. Pat. No. 2,504,393 to Cook indicates that similar mechanisms have also been employed to remove wheels from shafts.

It is therefore a primary object of the present invention to provide a novel mechanism for extracting ball bearing assemblies that does not damage the bearings, the bearing recess, or a shaft about which the bearing might be disposed.

It is an even further object of the present invention to provide a novel mechanism for extracting ball bearings including expandable elements that may be inserted into the arcuate groove typically defined between the races of a ball bearing and may be physically locked to either or both of the inner and outer races of the bearing in order to remove the bearing as a unit.

Among the several objects of the present invention is noted the contemplation of a novel mechanism for extracting bearings that imparts linear forces to the bearing structure in substantially axial alignment with the shaft about which the bearing may be disposed and with the bearing recess within which the bearing may be located thereby protecting the shaft and bearing recess from damage during extraction of the bearing.

It is an even further object of the present invention to provide a novel mechanism for extracting ball bearings, which mechanism is simple in nature, reliable in use, and low in cost.

Other and further objects, advantages, and features of the present invention will become apparent to one skilled in the art upon consideration of the written specification, the attached claims, and the annexed drawing. The form of the invention, which will now be described in detail, illustrates the general principles of the invention, but it is to be understood that this detailed description is not to be taken as limiting the scope of the present invention.

SUMMARY OF THE INVENTION

An extracting mechanism for bearings and the like may incorporate a housing structure through which may be threadedly received a bolt or other elongated threaded device capable of moving linearly and imparting a force tending to separate the housing from a shaft or other structure within or about which the bearing may be retained. A plurality of pairs of expandable finger assemblies, carried by the housing structure, may be received between the inner and outer races of the ball bearing structure and may be provided with angulated extremities capable of engaging corresponding annular bearing surfaces formed on the inner or outer races of the bearing assembly that are disposed in rolling engagement with the bearing balls.

After insertion of the angulated extremities of the pairs of expandable finger elements into the annular space defined between the bearing races, the expandable finger elements may be manipulated in such manner as to cause firm gripping of both the inner and outer races of the bearing structure. After this has been accomplished, the bolt or other rotatable threaded force developing device may be manipulated to impart linear movement of the housing relative to the retaining structure, the bearing thereby extracting the ball bearing assembly from its tightly retained relationship with the shaft, bearing recess or other bearing retaining structure.

BRIEF DESCRIPTION OF THE DRAWING

So that the manner in which the above recited features, advantages, and objects of the present invention, as well as others, which will become apparent, are attained and can be understood in detail, more particular description of the invention, briefly summarized above, may be had by reference to the embodiment thereof which is illustrated in the appended drawing, which drawing forms a part of this specification.

It is to be noted, however, that the appended drawing illustrates only a typical embodiment of the invention and is therefore not to be considered limiting of its scope, for the invention may admit to other equally effective embodiments.

IN THE DRAWING

Figure 1:
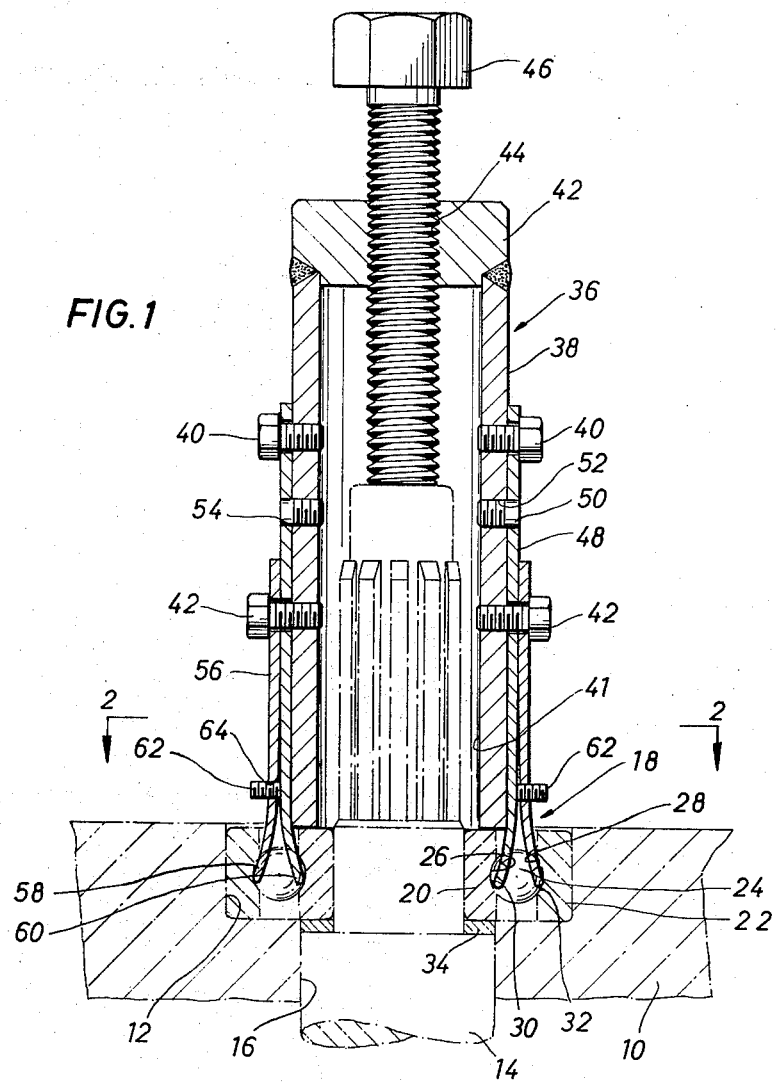

FIG. 1 is a sectional view illustrating an extracting mechanism for ball bearing assemblies and the like that is constructed in accordance with the present invention and is shown in operative position relative to a shaft and a ball bearing that is to be removed from its position about the shaft and within a bearing recess.

Figure 2:
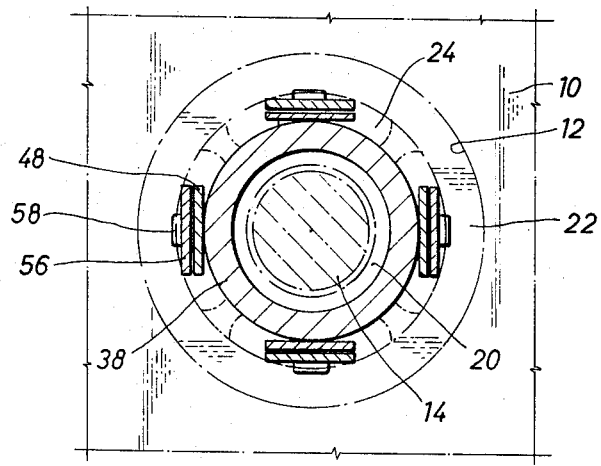

FIG. 2 is a sectional view of the present invention taken along the line 2—2 in FIG. 1.

DESCRIPTION OF PREFERRED EMBODIMENT

Now referring to the drawing and first to FIG. 1, there is shown a bearing retaining body 10 having a bearing recess 12 formed therein. A shaft 14 may extend through a bore 16 formed within the body 10 and may be mounted in relatively friction-free rotatable relation with the body 10 by a ball bearing assembly, illustrated generally at 18, which incorporates an inner race 20, an outer race 22 and a plurality of bearing balls 24.

Tapered surfaces 26 and 28 are typically defined at the outer periphery of the inner race 20 and the inner periphery of the outer race 22, respectively, in order to prevent the bearing balls 24 from becoming separated from the bearing structure. Likewise, annular arcuate grooves 30 and 32 are typically provided at the outer periphery of the inner race and the inner periphery of the outer race, respectively, which cooperate, when in assembly, to define an annular channel within which the bearing balls circulate as the races are rotated one relative to the other. Typically, the arcuate grooves will be of larger curvature than the radius of curvature of the bearing balls in order to adapt the bearing balls for point contact with the annular grooves thereby effectively retarding the development of friction between the bearing balls and the races.

If desired, an annular seal 34 may be incorporated between the shaft 14 and the inner race 20 in order to prevent leakage of lubricant along the rotatable shaft. Other seal means, not shown, are typically provided which cooperate with a seal such as shown at 34 to define an annular lubricant chamber encapsulating the bearing. Bearing assemblies of this nature are therefore protected from wear by lubricant retained within the lubricant chamber and will function satisfactorily for extended periods of time without requiring servicing.

A ball bearing, such as illustrated generally at 18, if press-fitted within the bearing recess 12 and if tightly fitted to the rotatable shaft 14, will be virtually impossible to remove, without damage to the bearing, the bearing recess or the shaft, because extraction tools may not be inserted behind the bearing or between the bearing and the wall structure of the housing. Typically, such bearing assemblies must be pried from the retained position thereof or must be cut apart and removed in pieces as discussed above, which generally destroys the bearing and may damage other structural elements.

It will be desirable, therefore, to tightly grip the bearing structure and move the same linearly with respect to the axes of the bearing recess and the shaft about which the bearing is disposed. A mechanism for tightly gripping the ball bearing structure 18 and for imparting linear movement to the same may conveniently take the form illustrated in FIGS. 1 and 2 which depict a bearing extractor housing illustrated generally at 36 that may incorporate a generally tubular body 38 defining an opening 41 at one extremity thereof and having the opposite extremity closed by an end wall 42. If desired, the end wall 42 may be formed integrally with the body 38 or may be welded to the body as shown in FIG. 1 within the spirit and scope of the present invention.

The end wall 34 may be provided with a centrally located threaded aperture 44 within which may be threadedly received a bolt 46 or other elongated threaded device capable of moving linearly relative to the body 38 upon being rotated.

It will be desirable to provide means for entering the annular groove defined by the inner and outer races 20 and 22 of the bearing structure which means is adapted to tightly engage at least one of the inner or outer races in order to tightly retain or substantially lock the tubular body in assembly with the bearing. Accordingly, a mechanism for substantially locking the bearing structure to the body 38 may conveniently take the form illustrated in FIG. 1 where a plurality of pairs of locking fingers, carried by the body structure, may be received within the annular groove defined by the bearing structure and may be expanded to secure or lock the inner and outer races to the housing structure. The finger mechanism may be constructed as illustrated in FIGS. 1 and 2 which depicts four long fingers 48 that are secured to the body 38 by bolts 40 and 42 extending through appropriate apertures formed in the finger structure.

Guide pins 50 may be received within appropriate threaded apertures 52 formed in the body structure and may extend into guide apertures 54 to maintain positive alignment between the body and finger structures. Four shorter fingers 56 may be retained in assembly with the fingers 48 by the bolts 42 and may be provided with out-turned extremities 58, co-operating with in-turned extremities 60, defined on the longer fingers 48, to provide diverging locking elements that are adapted to be received within the annular groove between the races for locking engagement with the arcuate surfaces 30 and 32 of the inner and outer bearing races, respectively.

The finger assembly, with the diverging locking elements at the lower extremities thereof, will be capable of being inserted into the annular groove defined between the inner and outer bearing races. A mechanism for spreading the fingers to force the curved or angulated portions of the fingers into locking engagement with the respective arcuate surfaces of the bearings may conveniently take the form of a set screw 62 or the like that may be received within a threaded aperture 64 defined in the shorter fingers 56. If desired, the finger elements of the finger assemblies may be curved to conform to the configuration of the flanges of the bearing races thereby establishing substantial surface area contact therebetween and thereby evenly distributing forces transmitted through the fingers to the bearing races and preventing deformation of the bearing races or the finger elements by brinelling.

The bearing extracting assembly of the present invention will be properly positioned relative to the bearing to be extracted when the generally tubular body portion 38 thereof is disposed in engagement with the upper surface of the inner bearing race as depicted in FIG. 1 with the finger assemblies received within the arcuate opening between the bearing races and disposed in locking engagement with the opposed arcuate bearing race groove surfaces 30 and 32. With the bearing extractor assembly so disposed, the tubular body and the finger assemblies will cooperate with the inner bearing race to define an essentially unitary structural arrangement thereby presenting the finger assemblies in relatively unyieldable manner and preventing separation of the finger assemblies from the bearing assembly even though substantial force might be necessary to move the bearing assembly relative to the bearing support body 10.

After the diverging locking portions of the finger assemblies have been received within the annular groove between the bearing races, the set screws 62, bearing upon the inner longer fingers 48, may be rotated in usual manner thereby forcing the lower extremities of the fingers apart and causing the diverging locking portion of each of the fingers to move into tight locking engagement with the arcuate surfaces 30 and 32 of the bearing races 20 and 22, respectively. Spreading of the diverging portion of the fingers effectively establishes locking engagement between the finger assemblies and the bearing races and, therefore, it is obvious that movement of the housing 38 outwardly away from the body 10 and shaft 14 will cause extraction of the bearing assembly from the bearing recess 12. As was indicated above, such outward movement of the housing 38 relative to the body 10 may be accomplished by imparting rotation to the bolt 46, causing the threaded engagement between the bolt and the end wall 42 of the housing to impart inward linear movement to the bolt until it moves into engagement with the extremity of the shaft 14 as depicted in FIG. 1. Further rotation of the bolt 46 will allow sufficient force to be developed between the shaft and the housing to overcome the forces retaining the bearing assembly 18 within the bearing recess 12. As the forces retaining the bearing assembly are overcome, the tubular housing will be moved outwardly away from the body 10 thereby moving with it the finger assemblies and the bearing assembly which is gripped by the finger assemblies.

The bearing assembly is thus removed simply and efficiently without damage and without damage to either the bearing recess 12 or the cylindrical surface of shaft 14 about which the inner race 20 of the bearing assembly is disposed. It is possible, therefore, if desired, to reuse the bearing assembly simply by pressing it back into the bearing recess and about the bearing engaging surface of the shaft 14.

After the bearing assembly has been removed from its bearing recess, it may be released from the diverging locking portion of the finger assemblies simply by rotating the set screws 62 and allowing the fingers to move together and releasing the locking engagement with the arcuate surfaces 30 and 32 of the inner and outer bearing races, resectively. The finger elements, if desired, may be composed of spring material which causes them to readily return to the collapsed position thereof, releasing the bearing races, upon unlocking movement of the set screws.

In the event a bearing assembly may be disposed about a shaft that is relatively short and does not extend completely through the bearing assembly, it may be desirable to provide a relatively short tool segment, such as a bar or the like, that may be positioned between the bolt 46 and the body 10 or between the bolt and some other structure in immovable relation with respect to the body 10. It is thus apparent that bearing assemblies may be effectively removed from bearing recesses even though a shaft does not extend through the aperture defined by the inner race of the bearing structure.

In view of the foregoing, it is readily apparent that I have provided a novel extracting mechanism for ball bearings and the like that may be utilized for extracting bearing assemblies that may be tightly received within bearing recesses and/or received about rotatable shafts in such manner that removal of the same would be extremely difficult. The bearing extracting mechanism of my invention effectively achieves removal of such bearing assemblies without in any way damaging the bearing assemblies and without causing damage to the bearing recess within which the bearing is retained and without damaging the shaft about which the bearing might be received.

Bearing assemblies removed by apparatus constructed in accordance with my invention may be reused, if desired, simply by pressing the same to the original position thereof within the bearing recess and/or about the rotatable shaft. The bearing extracting assembly of my invention is especially useful in extracting the rear wheel bearings of certain automobiles having ball bearings arranged essentially as depicted in broken line in FIG. 1 of the drawing. A bearing extracting mechanism, constructed in accordance with my invention, is of simple construction, is simple to use, and is exceptionally reliable in its ability to extract bearings successfully throughout a long service life.

The only wear likely to occur during utilization of my bearing extracting mechanism will be wear of the tips or diverging portions of the fingers and such wear may be compensated for simply by slight bending of the diverging portions of the fingers. If desired, it may be convenient to replace worn finger elements simply and efficiently without involving substantial cost. It is therefore seen that this invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

The bearing extracting mechanism of my invention is constructed for cooperating with the bearing assembly to be extracted to define essentially unitary structural association with the inner race of the bearing thereby lending substantial structural integrity to the finger assemblies and effectively overcoming any tendency for the finger assemblies to become separated from the bearing assembly as the bearing is being extracted.

As many possible embodiments may be made of this invention without departing from the spirit or scope thereof, it is to be understood that all matters hereinabove set forth or shown in the accompanying drawing are to be interpreted as illustrative and not in a limiting sense.

I claim:

1. A mechanism for extracting ball bearing assemblies from assembly with a body structure, said bearing assemblies having an inner race and an outer race cooperating to define an annular groove means retaining a plurality of bearing balls therein, the inner and outer races of the bearings having opposed arcuate surfaces engaged by the bearing balls, said mechanism comprising:

housing means;

race engaging means carried by said housing means and being received within the annular groove between the inner and outer races of a ball bearing assembly;

means for moving said race engaging means relative to said housing to cause gripping of at least one of said inner and outer races; and means for imparting linear movement to said housing means and race engaging means relative to the body structure to extract the bearing assembly from its assembly with the body structure.

2. A mechanism as recited in claim 1:

said housing means being of generally tubular configuration and having one closed end wall;

a threaded aperture defined within said end wall; and said means for imparting linear movement to said housing means and said race engaging means being an elongated threaded element received by said threaded aperture and extending into said tubular housing.

3. A mechanism as recited in claim 2:

said race engaging means being a plurality of fingers carried by said tubular housing and adapted to be received between the inner and outer races of said bearing means;

race engaging means provided at the free extremities of each of said fingers; and locking means carried by said housing means for urging said race engaging means into locked engagement with at least one of the races of the bearing.

4. A mechanism as recited in claim 3:

said race engaging means being urged by said locking means into locked engagement with both the inner and outer races of the bearing.

5. A mechanism as recited in claim 2:

said race engaging means comprising a plurality of pairs of race engaging fingers carried by said housing and adapted to be received between the inner and outer races of the bearing;

each of said fingers having engaging means at the extremities thereof for engaging the opposed arcuate surfaces of the inner and outer races of the bearing; and means for spreading the free extremities of said fingers between the inner and outer races of the bearing to lock said engaging means in engagement with said arcuate surfaces of the inner and outer races of the bearings.

6. A mechanism as recited in claim 5:

said race engaging means being diverging extremities of said fingers diverging toward the respective arcuate bearing surface of said inner and outer races.

7. A mechanism as recited in claim 5:

said race engaging means being elongated leaf spring means having opposed diverging free extremities; and said means for spreading said free extremities of said fingers comprising screw means threadedly received by one finger of each pair of fingers and bearing upon the opposite one of said fingers, said screw means being rotatable to spread the free extremities of said fingers and develop locking engagement between said free extremities of said fingers and the races of the bearing assembly.

8. A mechanism as recited in claim 1:

said housing means being of generally tubular configuration and having one closed end wall;

said race engaging means comprising a plurality of pairs of race engaging fingers carried by said housing means and having free extremities adapted to be received between the inner and outer races of the bearing assembly;

each of said fingers having race engaging means defined at said free extremities and being movable relative to said housing into substantially locked engagement with at least one race of the bearing assembly;

said means for moving said race engaging means comprising means for spreading the free extremities of said pairs of race engaging fingers to urge said fingers into substantially locked engagement with said race of the bearing assembly;

a threaded aperture being defined within said end wall, said means for imparting linear movement to said housing means being an elongated threaded member received by said threaded aperture, extending into said tubular housing and adapted to bear upon structure retaining the bearing assembly in position.

9. A mechanism as recited in claim 1, including:

means for establishing unitary structural relationship between one of the races of the bearing assembly, the housing means and the race engaging means to prevent separation of said mechanism from said bearing assembly during extraction of said bearing assembly.

10. A mechanism as recited in claim 1:

said housing means being disposed in engagement with at least one of the races of said bearing assembly in the operative position thereof relative to said bearing assembly; and said race engaging means being stabilized by said housing means and engaging at least one of said arcuate surfaces in the operative position thereof.

11. A mechanism for extracting ball bearing assemblies having an inner race disposed about a shaft and an outer race received within a bearing aperture, the inner and outer races of the bearing assembly defining annular groove means within which is disposed a plurality of bearing balls, said inner and outer races defining annular flange means to retain said bearing balls within said groove means, said mechanism comprising:

a housing of generally tubular configuration having one closed end wall;

a plurality of race engaging finger means being carried by said tubular housing;

race engaging means being provided at the free extremities of each of said fingers;

locking means for urging said race engaging means into locked engagement with at least one of the races of the bearing assembly; and jack screw means threadedly received by said housing and being disposed for engagement with the extremity of said shaft, said jack screw means, upon being moved linearly toward said shaft, urging said housing means away from said shaft and thereby extracting the bearing.

12. A mechanism as recited in claim 9:

said race engaging finger means comprising a plurality of pairs of fingers supported by said tubular body means having free extremities thereof extending beyond one end of said housing; and means for urging the free extremities of said fingers apart and forcing said race engaging means into tight engagement with the internal and external races of the bearing.

13. A mechanism as recited in claim 10:

said race engaging means being diverging extremities of said fingers, said diverging extremities being extended toward the arcuate surface of the respective race to be engaged.

14. A mechanism as recited in claim 11:

said means for urging the free extremities of said fingers apart comprising screw means threadedly received by one finger of each of said pairs of fingers and being disposed for engagement with the opposite one of said fingers;

15. A mechanism as recited in claim 9:

said race engaging means being opposed diverging extremities of each of said pairs of fingers cooperating to define diverging locking means adapted for locking engagement with arcuate surface means defined by said bearing races; and means for urging the free extremities of said fingers apart to develop said locking engagement.

16. A mechanism as recited in claim 13:

said race engaging fingers being elongated leaf spring means having opposed diverging free extremities; and said means for spreading said free extremities of said fingers comprising screw means threadedly received by one finger of each pair of fingers and bearing upon the opposite one of said fingers, said screw means being rotatable to spread the free extremities of said fingers and develop locking engagement with the races of the bearing assembly.

17. A mechanism as recited in claim 11:

said housing means being disposed in engagement with at least one of the races of said bearing assembly in the operative position thereof relative to said bearing assembly; and said race engaging means being stabilized by said housing means and engaging at least one of said arcuate surfaces in the operative position thereof.

* * * * *